US012606669B2

(12) United States Patent
Praphulla et al.

(10) Patent No.: US 12,606,669 B2
(45) Date of Patent: Apr. 21, 2026

(54) POLYMERS, METHOD FOR FABRICATING POLYMERS, AND PRODUCTS INCLUDING POLYMERS

(71) Applicant: PLANTEE BIOPLASTICS INC., Vancouver (CA)

(72) Inventors: Praphulla, Vancouver (CA); Prashant Agrawal, Kingston (CA); Richard Chen, Vancouver (CA)

(73) Assignee: PLANTEE BIOPLASTICS INC., Vancouver (CA)

( * ) Notice: Subject to any disclaimer, the term of this patent is extended or adjusted under 35 U.S.C. 154(b) by 829 days.

(21) Appl. No.: 17/781,064

(22) PCT Filed: Dec. 9, 2020

(86) PCT No.: PCT/CA2020/051691
§ 371 (c)(1),
(2) Date: May 31, 2022

(87) PCT Pub. No.: WO2021/113966
PCT Pub. Date: Jun. 17, 2021

(65) Prior Publication Data

US 2023/0044393 A1 Feb. 9, 2023

Related U.S. Application Data

(60) Provisional application No. 62/946,011, filed on Dec. 10, 2019.

(51) Int. Cl.
*C08G 63/183* (2006.01)
*A01K 91/00* (2006.01)
(Continued)

(52) U.S. Cl.
CPC ............ *C08G 63/183* (2013.01); *A01K 91/00* (2013.01); *C08F 220/34* (2013.01); *C08F 283/02* (2013.01); *C08G 2230/00* (2013.01)

(58) Field of Classification Search
CPC .............. C08G 63/183; C08G 2230/00; C08G 63/6856; C08G 63/912; C08G 63/916;
(Continued)

(56) References Cited

U.S. PATENT DOCUMENTS 4,764,364 A 8/1988 Heller et al.
5,610,241 A * 3/1997 Lee .................... C08G 63/6852 525/413
(Continued)

FOREIGN PATENT DOCUMENTS

CN 102234851 A 11/2011
EP 1054085 B1 3/2005
(Continued)

OTHER PUBLICATIONS

Wu Carbon Reference (Year: 2009).*
(Continued)

*Primary Examiner* — John M Cooney
*Assistant Examiner* — Adam J Berro
(74) *Attorney, Agent, or Firm* — Adrienne Bieber McNeil; ABM Intellectual Property Inc.

(57) ABSTRACT

A biodegradable polymer usable in fishing gear and that biodegrades in aquatic environments. The polymer includes a polymer backbone that has monomeric units that are susceptible to hydrolytic degradation, and a plurality of pH responsive moieties. Each pH responsive moiety is grafted to a respective one of the monomeric units. The pH responsive moieties are relatively hydrophilic when exposed to an aqueous solution of a pro-biodegradation pH range to facilitate hydrolytic degradation of the monomeric units, and are relatively hydrophobic when removed from the aqueous solution of the pro-biodegradation pH range, to protect the monomeric units from hydrolytic degradation.

8 Claims, 4 Drawing Sheets

(51) Int. Cl.
*C08F 220/34* (2006.01)
*C08F 283/02* (2006.01)

(58) Field of Classification Search
CPC ....... C08G 63/08; C08G 63/16; C08F 220/34; C08F 283/02; C08L 67/02; C08L 101/16; D01F 1/10; D01F 6/84; D01F 6/92
See application file for complete search history.

(56) References Cited

U.S. PATENT DOCUMENTS

| | | | |
|---|---|---|---|
| 6,646,102 | B2 | 11/2003 | Boriack et al. |
| 2009/0123544 | A1 | 5/2009 | Liu et al. |
| 2010/0266858 | A1 | 10/2010 | Chopinez et al. |
| 2011/0151566 | A1 | 6/2011 | Hedrick et al. |
| 2015/0174867 | A1 | 6/2015 | Neuman et al. |
| 2017/0112111 | A1 | 4/2017 | Kim et al. |
| 2018/0127554 | A1 | 5/2018 | Mohanty et al. |
| 2019/0276664 | A1 | 9/2019 | LaPray et al. |
| 2020/0308359 | A1 | 10/2020 | Glenn et al. |

FOREIGN PATENT DOCUMENTS

| | | | |
|---|---|---|---|
| EP | 3517608 | A1 | 7/2019 |
| JP | H07278965 | | 10/1995 |
| JP | 2020015887 | A | 1/2020 |
| KR | 101658521 | B1 | 9/2016 |
| SG | 10201802342 | U | 11/2018 |
| WO | 2010009355 | A2 | 1/2010 |
| WO | 2011111071 | A1 | 9/2011 |
| WO | 2019113713 | A1 | 6/2019 |

OTHER PUBLICATIONS

Godjevargova J. Appl. Polym. Sci. Reference (Year: 1996).*
Wu Macromolecular Bioscience Reference (Year: 2005).*
Organic Chemistry, Fourth Edition Excerpt (Year: 2005).*
Lin European Polymer Journal Article (Year: 2019).*
Grover Journal of Applied Polymer Science Article (Year: 2010).*
Rao Polymer Letters Article (Year: 1972).*
Yao Polymer Chemistry Article (Year: 2016).*
Zhang Polymer Degradation and Stability Article (Year: 2013).*
Wang RSC Advances Article (Year: 2017).*
"Biodegradable compatibilized polymer blends for packaging applications: A literature review", Rajendran Muthuraj, Manjusri Misra, Amar Kumar Mohanty, Journal of Applied Polymer Science Jun. 2018 vol. 135 (Issue 24).
"Biodegradable Fishing Line—Everything You Need to Know", Mar. 30, 2020, RealReel Fishin.
"Biodegradable Poly(butylene succinate) and Poly(butylene adipate-co-terephthalate) Blends: Reactive Extrusion and Performance Evaluation", Rajendran Muthuraj, Manjusri Misra, Amar Kumar Mohanty, Journal of Polymers and the Environment Sep. 2014, vol. 22, Issue 3, pp. 336-349.
"Biodegradable three-dimensional networks of poly(dimethylamino ethyl methacrylate). Synthesis, characterization and in vitro studies of structural degradation and cytotoxicity", Monique J Bruining, Harriet G.T. Blaauwgeers, Roel Kuijer, Elisabeth Pels, Rudy M.M.A Nuijts, Leo H Koole, Biomaterials, vol. 21, Issue 6, 2000, pp. 595-604, ISSN 0142-9612, https://doi.org/10.1016/S0142-9612(99)00223-9.
"Compatibility of Chitosan in Polymer Blends by Chemical Modification of Bio-based Polyesters", Oscar Vernaez et al., Polymers 2019, 11, 1939; doi: 10.3390/polym11121939.
"Development and physical properties on the monofilament for gill nets and traps using biodegradable aliphatic bolybutylene succinate resin", Seong-Wook Park et al.J. Kor. Soc. Fish. Tech., 43(4), 281-290, 2007.
"Development of new generation fishing gear: A resistant and biodegradable monofilament", Morgan Deroiné et al., Polymer Testing vol. 74, Apr. 2019, pp. 163-169.
"Evaluation of biodegradabilities of biosynthetic and chemosynthetic polyesters in river water." , Doi Y, Kasuya K, Abe H, Koyama N, Ishiwatara S, Takagi K, Polym Degrad Stab (1996) 51:281-286.
"Hydrolytic degradation of biodegradable polyesters under simulated environmental conditions", Rajendran Muthuraj, Manjusri Misra, A.K. Mohanty, Journal of Applied Polymer Science, Jul. 2015 vol. 132 (Issue 27).
"Novel tunable super-tough materials from biodegradable polymer blends: nano-structuring through reactive extrusion". Feng Wua, Manjusri Misra and Amar K. MohantyRSC Adv., 2019, 9, 2836-2847.
"pH-Responsive biomineralization onto chitosan grafted biodegradable substrates", Catarina I. Dias et al., J. Mater. Chem., 2008, 18, 2493-2499.
"Physical Properties of Biodegradable Fishing Net in Accordance with Heat-Treatment Conditions for Reducing Ghost Fishing", Seonghun Kim et al., Turk. J. Fish. & Aquat. Sci. 20 (2019) (2), 127-135.
"Preparation and physical properties of biodegradable polybutylene succinate/ polybutyleneadipate-co-terephthalate blend monofilament by melt spinning.", Park SW, Kim SH, Choi HS, Cho HH, J Kor Soc Fish Tech (2010) 46:257-264 (English abstract).
"Use of biodegradable driftnets to prevent ghost fishing: physical properties and fishing performance for yellow croaker", S. Kim et al. Animal Conservation 19 (2016) 309-319.
"Weatherability of biodegradable polybutylene succinate(PBS) monofilaments". Seong-Wook Park and Jae-Hyun Bae, Bulletin of the Korean society of Fisheries Technology 44 (4): 265-272 Nov. 2008.
Akopova, T.A.; Demina, T.S.; Khavpachev, M.A.; Popyrina, T.N.; Grachev, A.V.; Ivanov, P.L.; Zelenetskii, A.N. Hydrophobic Modification of Chitosan via Reactive Solvent-Free Extrusion. Polymers 2021, 13, 2807. https://doi.org/10.3390/polym13162807.
Calcio Gaudino, E.; Grillo, G.; Manzoli, M.; Tabasso, S.; Maccagnan, S.; Cravotto, G. Mechanochemical Applications of Reactive Extrusion from Organic Synthesis to Catalytic and Active Materials. Molecules 2022, 27, 449. https://doi.org/10.3390/molecules27020449.
CAS Registry No. 9010-77-9; Nov. 16, 1984.
Flores Gallarda, S.G. et al., "Polypropylene/Polypropylene-Grafted Acrylic Acid Blends for Multilayer Films: Preparation and Characterization", J. Applied Polymer Science, Dec. 18, 2000 (Dec. 18, 2000), vol. 79 (8), pp. 1497-1505.
Hachim, D. et al., "Surface Modification of Polypropylene for Enhanced Layer-by-Layer Deposition of Polyelectrolytes", J. Biomedical Materials Research A, Apr. 10, 2018 (Apr. 10, 2018), vol. 106A (7), pp. 2078-2085.
International Search Report, Written Opinion of the International Searching Authority, and CIPO Examination Notes for PCT/CA2020/051691; Mailed on Feb. 15, 2021.
Jaworska, J. et al., "Biodegradable Polycarbonates Containing Side Carboxyl Groups—Synthesis, Properties, and Degradation Study", J. Polymer Science, Part A: Polymer Chemistry, Jun. 14, 2017 (Jun. 14, 2017), vol. 55 (17), pp. 2756-2769.
Kurańska M, Malewska E, Polaczek K, Prociak A, Kubacka J. A Pathway toward a New Era of Open-Cell Polyurethane Foams-Influence of Bio-Polyols Derived from Used Cooking Oil on Foams Properties. Materials (Basel). Nov. 16, 2020;13(22):5161. doi: 10.3390/ma13225161. PMID: 33207702; PMCID: PMC7698128.
Lopera-VAlle, A. et al., "Amine Responsive Poly(lactic acid) (PLA) and Succinic Anhydride (SAh) Graft-Polymer: Synthesis and Characterization", Polymers, Sep. 7, 2019 (Sep. 7, 2019), vol. 11(9), pp. 1466-1484.
Masoud Farshbaf, Soodabeh Davaran, Amir Zarebkohan, Nasim Annabi, Abolfazl Akbarzadeh & Roya Salehi (2018) "Significant role of cationic polymers in drug delivery systems, Artificial Cells, Nanomedicine, and Biotechnology", 46:8, 1872-1891, DOI: 10.1080/21691401.2017.1395344.
Tang, Houliang et al. "Recent Development of pH-Responsive Polymers for Cancer Nanomedicine." Molecules (Basel, Switzerland) vol. 24,1 4. Dec. 20, 2018, doi:10.3390/molecules24010004.
Zakuwan, S.Z.; Ahmad, I.; Abu Tahrim, N.; Mohamed, F. Functional Hydrophilic Membrane for Oil-Water Separation Based on

(56) References Cited

OTHER PUBLICATIONS

Modified Bio-Based Chitosan—Gelatin. Polymers 2021, 13, 1176. https://doi.org/10.3390/polym13071176.
Office Action Issued in CA 3159959 on Oct. 18, 2023.

* cited by examiner

POLYMERS, METHOD FOR FABRICATING POLYMERS, AND PRODUCTS INCLUDING POLYMERS

CROSS-REFERENCES TO RELATED APPLICATIONS

This application is a national stage entry of International Patent Application No. PCT/CA2020/051691 filed on Dec. 9, 2020, which claims priority to U.S. Provisional Patent Application No. 62/946,011 filed on Dec. 10, 2019, each of which is incorporated herein by reference in its entirety.

FIELD

This document relates to polymers such as biodegradable polymers. More specifically, this document relates to biodegradable polymers, methods for fabricating biodegradable polymers, and products including biodegradable polymers, such as fishing gear.

BACKGROUND

United States Patent Application Publication No. 2019/0276664 A1 (La Pray et al.) discloses composite blends of polyester containing plastic materials, and a starch-based polymeric material that increases the biodegradability of the polyesters of such a composite in simulated or actual marine conditions (e.g., simulated by ASTM D-6691).

SUMMARY

The following summary is intended to introduce the reader to various aspects of the detailed description, but not to define or delimit any invention.

Biodegradable polymers are disclosed. According to some aspects, a biodegradable polymer includes a polymer backbone having monomeric units that are susceptible to hydrolytic degradation, and a plurality of pH responsive moieties. Each pH responsive moiety is grafted to a respective one of the monomeric units. The pH responsive moieties are relatively hydrophilic when exposed to an aqueous solution of a pro-biodegradation pH range to facilitate hydrolytic degradation of the monomeric units, and are relatively hydrophobic when removed from the aqueous solution of the pro-biodegradation pH range, to protect the monomeric units from hydrolytic degradation.

In some examples, the pH responsive moieties have a pKa, and the pro-biodegradation pH range is below the pKa. In some examples, the pH responsive moieties have a pKa, and the pro-biodegradation pH range is above the pKa.

In some examples, the pro-biodegradation pH range is at or below about 7.5. In some examples, the pro-biodegradation pH range is between about 6.5 and about 7.5, inclusive. In some examples, the pro-biodegradation pH range is at or above about 7.5.

In some examples, the polymer backbone includes polybutylene adipate-co-terephthalate (PBAT), polybutylene succinate (PBS), and/or polylactic acid (PLA).

In some examples, the pH responsive moieties include a tertiary amine, a carboxylic acid, and/or a phosphonic acid. The pH responsive moieties can include or can be at least one of 2-dimethylaminoethyl methacrylate, 2-diisopropylaminoethyl methacrylate, 2-diethylaminoethyl methacrylate, ethyl 3-(N,N-dimethylamino)acrylate, and/or methacrylic acid.

In some examples, the polymer backbone includes polybutylene adipate-co-terephthalate and the pH responsive moieties include 2-dimethylaminoethyl methacrylate.

Fishing gear is also disclosed. According to some aspects, fishing gear includes a line including a first biodegradable polymer. The first biodegradable polymer includes (i) a polymer backbone including monomeric units that are susceptible to hydrolytic degradation, and (ii) a plurality of pH responsive moieties. Each pH responsive moiety is grafted to a respective one of the monomeric units. The pH responsive moieties are relatively hydrophilic when exposed to an aqueous solution of a pro-biodegradation pH range to facilitate hydrolytic degradation of the monomeric units, and are relatively hydrophobic when removed from the aqueous solution of the pro-biodegradation pH range, to protect the monomeric units from hydrolytic degradation.

In some examples, the line is wound onto a reel. In some examples, the line is formed into a net.

In some examples, the line further includes a second biodegradable polymer blended with the first biodegradable polymer. The second biodegradable polymer can include or can be polylactic acid (PLA). Alternatively, the second biodegradable polymer can include (i) a second polymer backbone comprising a second set of monomeric units that are susceptible to hydrolytic degradation, and (ii) a second plurality of pH responsive moieties. Each pH responsive moiety of the second plurality can be grafted to a respective one of the monomeric units of the second set of monomeric units. The pH responsive moieties of the second plurality can be hydrophilic when exposed to the aqueous solution of the pro-biodegradation pH range to facilitate hydrolytic degradation of the second set of monomeric units, and can be hydrophobic when removed from the aqueous solution of the pro-biodegradation pH range, to protect the second set of monomeric units from hydrolytic degradation.

In some examples, the line has a tensile strength of at least about 40 mPa. In some examples, the line has an elongation at break of at most about 15.

In some examples, the pH responsive moieties have a pKa, and the pro-biodegradation pH range is below the pKa. In some examples, the pH responsive moieties have a pKa, and the pro-biodegradation pH range is above the pKa.

In some examples, the pro-biodegradation pH range is at or below about 7.5. In some examples, the pro-biodegradation pH range is between about 6.5 and about 7.5, inclusive. In some examples, the pro-biodegradation pH range is at or above about 7.5.

In some examples, the polymer backbone includes polybutylene adipate-co-terephthalate (PBAT) and/or polybutylene succinate (PBS) and/or polylactic acid (PLA).

In some examples, the pH responsive moieties include a tertiary amine, a carboxylic acid, and/or a phosphonic acid. The pH responsive moieties can be or can include at least one of 2-dimethylaminoethyl methacrylate, 2-diisopropylaminoethyl methacrylate, 2-diethylaminoethyl methacrylate, ethyl 3-(N,N-dimethylamino)acrylate, and methacrylic acid.

In some examples, the polymer backbone comprises polybutylene adipate-co-terephthalate and the pH responsive moieties comprises 2-dimethylaminoethyl methacrylate.

Methods for fabricating a biodegradable polymer are also disclosed. According to some aspects, a method for fabricating a biodegradable polymer includes grafting a pH responsive moiety onto a polymer backbone, to yield a biodegradable polymer; and extruding the biodegradable polymer into a line.

In some examples, step a. includes i) combining a solution of the pH responsive moiety with the polymer backbone in a solid state, to form a mixture, and ii) heating the mixture to melt the polymer backbone and graft the pH responsive moiety onto the polymer backbone.

In some examples, the polymer backbone comprises polybutylene adipate-co-terephthalate (PBAT).

In some examples, the pH responsive moiety includes a tertiary amine, a carboxylic acid, and/or a phosphonic acid. The pH responsive moiety can be or can include at least one of 2-dimethylaminoethyl methacrylate, 2-diisopropylaminoethyl methacrylate, 2-diethylaminoethyl methacrylate, ethyl 3-(N,N-dimethylamino)acrylate, and methacrylic acid.

In some examples, the polymer backbone includes polybutylene adipate-co-terephthalate and the pH responsive moiety comprises 2-dimethylaminoethyl methacrylate.

In some examples, the method further includes winding the line onto a reel or forming the line into a net.

In some examples, the method further includes blending a second biodegradable polymer with the first biodegradable polymer.

Further polymers are also disclosed. According to some aspects, a polymer includes a polymer backbone comprising monomeric units, and a plurality of pH responsive moieties. Each pH responsive moiety is grafted to a respective one of the monomeric units. The pH responsive moieties are relatively hydrophilic when exposed to an aqueous solution of a first pH range, and are relatively hydrophobic when removed from the aqueous solution of the first pH range.

In some examples, the polymer backbone includes polybutylene adipate-co-terephthalate (PBAT), polybutylene succinate (PBS), polylactic acid (PLA), and/or polypropylene. In some examples, the pH responsive moieties include a tertiary amine, a carboxylic acid, and/or a phosphonic acid.

BRIEF DESCRIPTION OF THE DRAWINGS

The drawings included herewith are for illustrating various examples of articles, methods, and apparatuses of the present specification and are not intended to limit the scope of what is taught in any way. In the drawings.

DETAILED DESCRIPTION

Various apparatuses or processes or compositions will be described below to provide an example of an embodiment of the claimed subject matter. No embodiment described below limits any claim and any claim may cover processes or apparatuses or compositions that differ from those described below. The claims are not limited to apparatuses or processes or compositions having all of the features of any one apparatus or process or composition described below or to features common to multiple or all of the apparatuses or processes or compositions described below. It is possible that an apparatus or process or composition described below is not an embodiment of any exclusive right granted by issuance of this patent application. Any subject matter described below and for which an exclusive right is not granted by issuance of this patent application may be the subject matter of another protective instrument, for example, a continuing patent application, and the applicants, inventors or owners do not intend to abandon, disclaim or dedicate to the public any such subject matter by its disclosure in this document.

Generally disclosed herein are polymers, methods for fabricating polymers, and products including polymers. The polymers can in some examples be used in the fishing industry, in fishing gear. For example, the polymers can be used in lines used in fishing rods, or in lines that are formed into nets, or in fishing bait, or in buoys, or in fish tags, or in lures, or in lobster trap components. The polymers can also be used in various other industries, such as in packaging. For example, the polymers can be used in bottles for storing carbonated beverages.

In some examples, the polymers disclosed herein are biodegradable; however, substantial biodegradation may be accelerated or may occur generally only when the polymer is exposed to (e.g. immersed in) an aqueous solution of a certain pH range (e.g. an aqueous solution of a pH of about 7.5 or lower, or an aqueous solution of a pH of about 7.5 or higher). The pH range under which biodegradation occurs or is accelerated is referred to herein as a "pro-biodegradation pH range". When the polymer is removed from such a solution—for example when the polymer is in storage in a relatively dry environment or is immersed in an aqueous solution that is outside the pro-biodegradation pH range—substantial biodegradation may generally not occur or may occur slowly (relative to the rate of biodegradation when the polymer is exposed to a solution of the pro-biodegradation pH range). Accordingly, in some examples, the polymers can be stored and/or used for relatively long periods of time, and have a relatively long shelf life. However, if left in a body of water such as a freshwater lake or an ocean, as may occur with fishing gear (e.g. when a fishing line is cut) or with packaging products (e.g. when a beverage bottle is discarded into a body of water), biodegradation may occur or may be accelerated.

Figure 1:
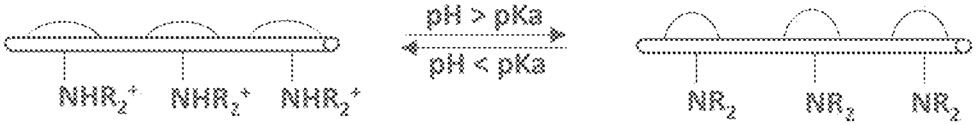
FIG. 1 is a schematic illustration showing the pH responsiveness of certain polymers disclosed herein.

In some examples, the biodegradable polymers disclosed herein can include a polymer backbone that includes monomeric units that are susceptible to degradation, particularly hydrolytic degradation (e.g. monomeric units including an ester). Various pH responsive moieties can be grafted to the monomeric units (i.e. one pH responsive moiety can be grafted to a respective one of the monomeric units). Each pH responsive moiety can include, for example, a tertiary amine, or a carboxylic acid, or a phosphonic acid. The pH responsive moieties can be charge neutral when dry or when exposed to an aqueous solution that is outside the pro-biodegradation pH range (e.g. a pH of above about 7.0 or 7.5 or 8.0 in the case of certain tertiary amines). The pH responsive moieties can be protonated and thereby positively charged when in an aqueous solution that is at the pro-biodegradation pH range (e.g. at or below a pH of about 7.0 or 7.5 or 8.0 in the case of certain tertiary amines). This renders the polymer relatively hydrophobic under certain conditions (e.g. when in regular use or when in storage), and this relative hydrophobicity protects the monomeric units from hydrolytic degradation. However, the polymer is rendered relatively hydrophilic (i.e. relative to when the pH responsive moiety is charge neutral) when immersed in an aqueous solution that is at the pro-biodegradation pH range, and this relative hydrophilicity facilitates hydrolytic degradation of the monomeric units. This pH responsiveness is shown schematically in FIG. 1 for a polymer including a tertiary amine as a pH responsive moiety, in which the contact angle of water increases due to relative hydrophobicity when the pH is above the pKa of the tertiary amine, and decreases due to relative hydrophilicity when the pH is below the pKa of the tertiary amine.

Figure 2:
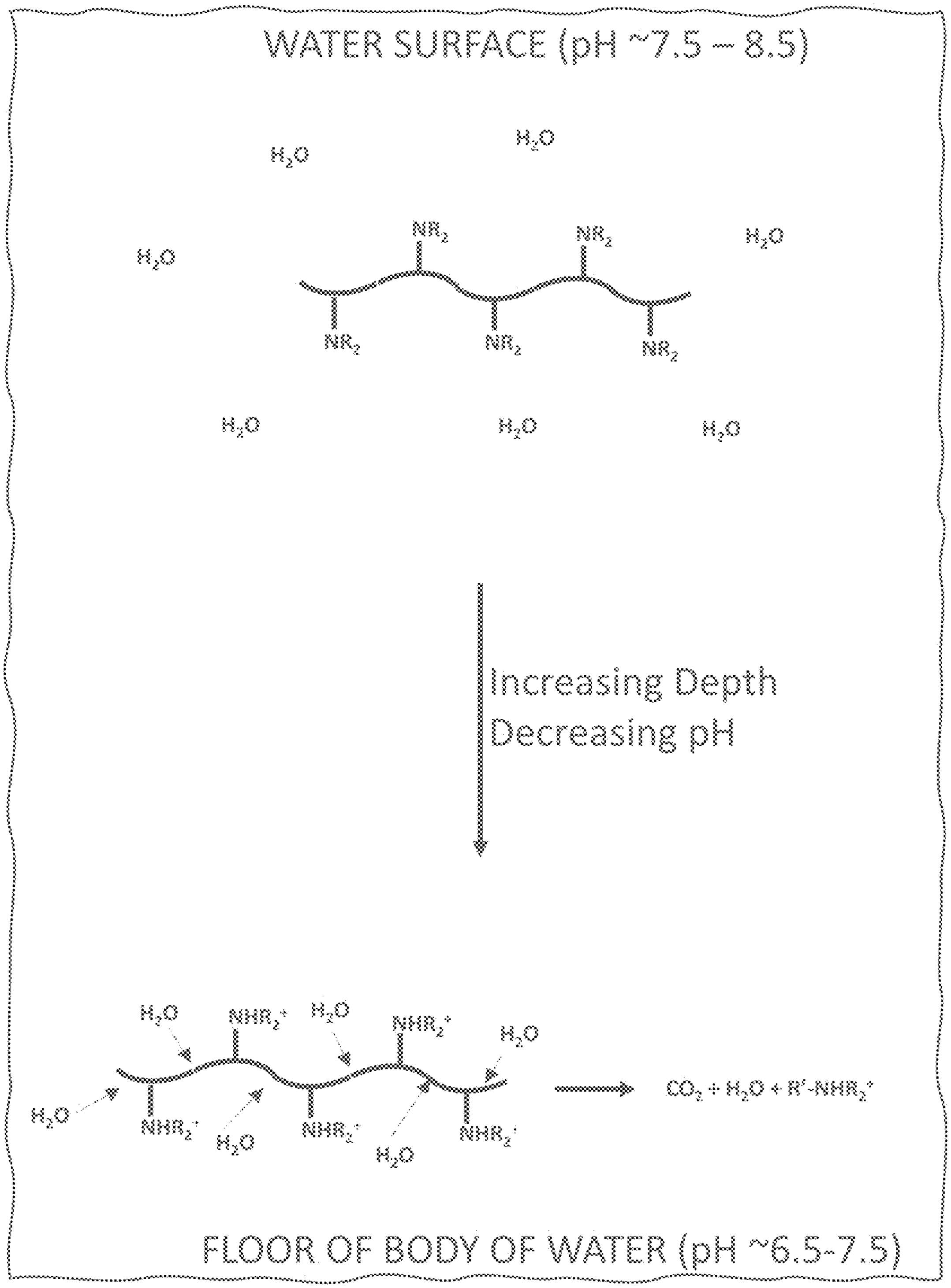
FIG. 2 is a schematic illustration showing the biodegradation of certain polymers disclosed herein when immersed at various depths in a freshwater body.

In some examples, the biodegradable polymers disclosed herein may be configured to biodegrade when left in water, e.g. when discarded in naturally occurring bodies of water. In general, in freshwater bodies of water (e.g. lakes, ponds, and streams), the pH is typically between about 6.5 and 8.5. The pH is generally higher (i.e. between about 7.5 and 8.5) near the surface and lower (i.e. between about 6.5 and 7.5) at greater depths. In general, in saltwater bodies of water (e.g. oceans and seas), the pH is typically between about 7 and about 8.2. The pH is generally higher (around 8.1) near the surface and lower (around 7) at greater depths. In some examples, the polymers disclosed herein may be configured such that biodegradation occurs under relatively low pH conditions, e.g. when the polymer sinks to greater depths in a body of water. This may be beneficial in the case of fishing gear such as fishing line, as sinking may occur when a fishing line is cut. This is shown schematically in FIG. 2. Although some biodegradation of the polymers may occur when the polymer is in use—e.g. when fishing line is used in conditions where the pH is below 7.5—this biodegradation will occur generally slowly, and may generally cease or slow even further when the polymer is removed from these conditions for storage, and is not considered significant. It is expected that fishing gear made from certain polymers disclosed herein will biodegrade completely when left in a body of water of the pro-biodegradation pH range over a period of about up to two years, or between 1 and two years. In other examples, the polymers disclosed herein may be configured such that biodegradation occurs or is accelerated under relatively high pH conditions, e.g. when the polymer floats on the surface of a body of water. This may be beneficial in the case of bottles used for the storage of carbonated beverages. As carbonated beverages are acidic, the polymers can be configured not to biodegrade or to biodegrade very slowly in acidic conditions; however, the polymers can biodegrade if a bottle is discarded in a body of water and left to float on the surface of the body of water, where the pH is generally higher.

As mentioned above, in some examples, the biodegradable polymers disclosed herein can include a polymer backbone that includes monomeric units that are susceptible to hydrolytic degradation, and a plurality of pH responsive moieties, where each pH responsive moiety is grafted to a respective one of the monomeric units. The polymer backbone of the biodegradable polymers can be or can include, for example, polybutylene adipate-co-terephthalate (PBAT), which is of the following structure:

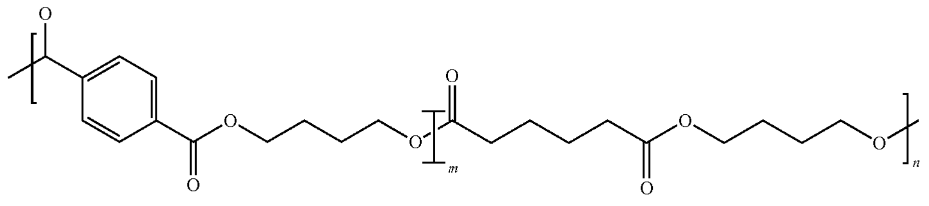

polybutylene adipate-co-terephthalate

In alternative examples, the polymer backbone can be or can include polybutylene succinate (PBS), which is of the following structure:

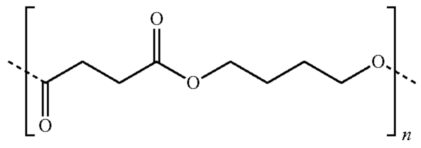

polybutylene succinate

In alternative examples, the polymer backbone can be of another structure, such as another polyester (e.g. polylactic acid).

The pH responsive moiety can in some examples be or include a tertiary amine, which will generally be protonated under relatively low pH conditions and will be charge-neutral under relatively high pH conditions. Examples of suitable tertiary amines include 2-(dimethylamino)ethyl methacrylate, 2-(diethylamino)ethyl methacrylate, 2-(diisopropylamino)ethyl methacrylate, or ethyl 3-(N,N-dimethylamino)acrylate, which have the following structure, respectively:

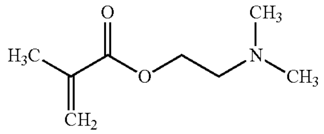

2-(dimethylamino)ethyl methacrylate

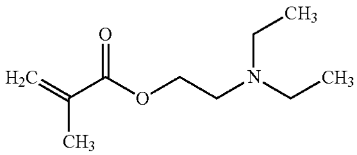

2-(diethylamino)ethyl methacrylate

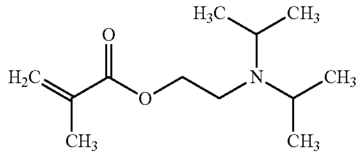

2-(diisopropylamino)ethyl methacrylate

-continued

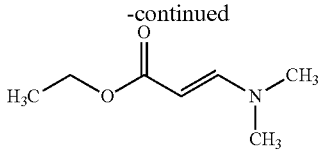

ethyl 3-(N,N-dimethylamino)acrylate

In alternative examples, the pH responsive moiety can be of another structure (examples of which are described further below).

In a particular example, the polymer includes a PBAT backbone and 2-(dimethylamino) ethyl methacrylate as the pH responsive moiety, which results in a polymer of the following structure:

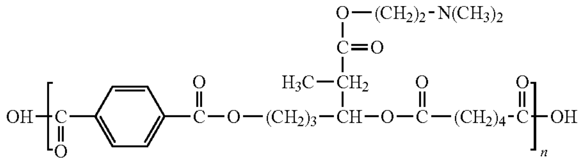

In this example, when exposed to an aqueous solution of a pro-biodegradation pH range, protonation, which results in relative hydrophilicity, can occur as follows:

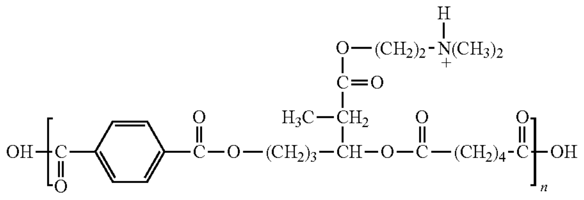

Upon protonation, hydrolytic degradation can occur as follows:

Biodegradation can continue until largely carbon dioxide and water (about 95%) remain, with a small amount of tertiary amines (about 5%) remaining as well.

In some examples, the pH responsive polymers disclosed herein can be blended with other polymers (e.g. polylactic acid (PLA), or another polymer of a similar pH responsiveness) and then formed into a final product (e.g. a fishing line). Blending of the polymers can alter the physical properties of the final product. For example, blending with PLA can reduce the elongation at break of the final product and stiffen the final product.

The polymers disclosed herein can in some examples be made by melt state reactive extrusion. In this process, a solution of a pH responsive moiety (e.g. 2-(dimethylamino) ethyl methacrylate in acetone) can be combined with a polymer backbone (i.e. a neat polymer) in a solid state (e.g. pellets of PBAT) and dried, to form a mixture of coated pellets. The mixture can then be heated to melt the polymer backbone and graft the pH responsive moiety onto the polymer backbone, to yield a biodegradable plastic melt. The biodegradable plastic melt can then be extruded into a line.

It has been found that polymers made in accordance with the above can have a relatively high tensile strength (i.e. a tensile strength suitable for use in fishing gear). For example, the tensile strength may be at least about 40 mPa (e.g. between about 40 MPa and 55 MPa), and the elongation at break may be at most about 15% (e.g. between about 9 and about 15%).

In alternative examples, the pH responsive moiety and/or the polymer backbone can be varied, in order to tailor the pH response of the polymer. For example, the pH responsive moiety and/or the polymer backbone can be varied in order to render the polymer biodegradable in saltwater, or biodegradable in other conditions.

Alternative examples of pH responsive moieties include acrylic acid, methacrylic acid and vinylphosphonic acid. Such examples can result in a polymer that is relatively hydrophobic at a low pH, and relatively hydrophilic at a high pH. As described above, such polymers may be useful in the storage of carbonated beverages.

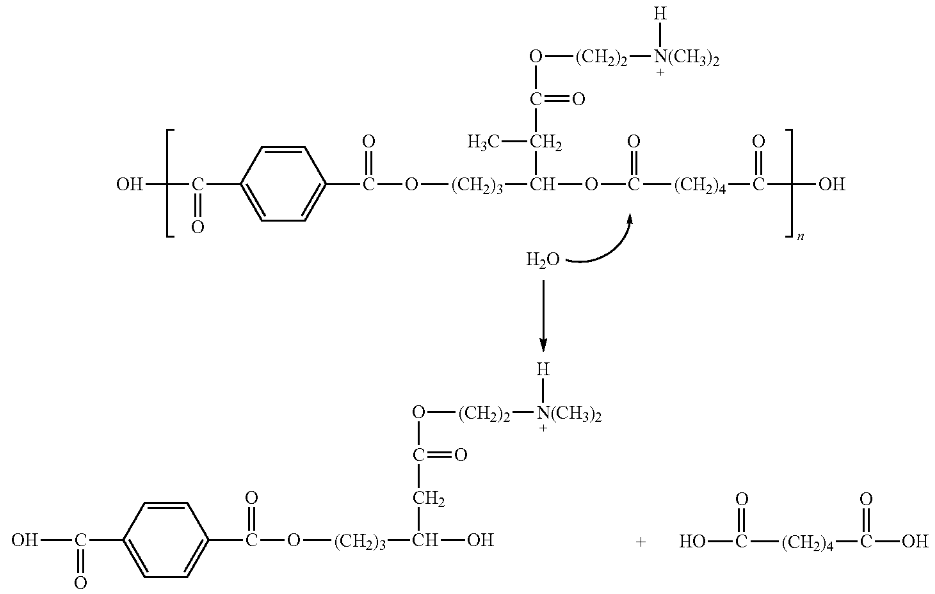

In further examples, the polymer backbone can be of a structure that is generally considered not to be biodegradable, or is considered to be minimally biodegradable (i.e. may take hundreds of years to biodegrade). Such polymer backbones include polyolefins such as polypropylene, polyethylene, and polyethylene terephthalate. It is believed that in some cases (e.g. for polyethylene terephthalate), by grafting pH responsive moieties to such polymeric backbones, biodegradation of such polymer backbones may be enhanced. That is, when in the pro-biodegradation pH range, the hydrophilicity of the pH responsive moieties may promote faster biodegradation. In other cases (e.g. for polypropylene or polyethylene), it is believed that by grafting pH responsive moieties to such polymeric backbones, the surface behavior of such polymers may be modified, which may provide additional uses for such polymers.

While the above description provides examples of one or more processes or apparatuses or compositions, it will be appreciated that other processes or apparatuses or compositions may be within the scope of the accompanying claims.

To the extent any amendments, characterizations, or other assertions previously made (in this or in any related patent applications or patents, including any parent, sibling, or child) with respect to any art, prior or otherwise, could be construed as a disclaimer of any subject matter supported by the present disclosure of this application, Applicant hereby rescinds and retracts such disclaimer. Applicant also respectfully submits that any prior art previously considered in any related patent applications or patents, including any parent, sibling, or child, may need to be re-visited.

EXAMPLES

Materials & Methods

Sample Preparation & Reactive Extrusion: Polymer monofilaments (also referred to as polymer lines) of the composition shown in Table 1 were created as described below. The nomenclature used in Table 1 is referred to throughout the Examples section.

For Polymer 1 in Table 1: Neat polybutylene adipate terephthalate (PBAT) (Xinjiang Blue Ridge Tunhe Polyester Co, Ltd) was dried in a vacuum oven at 60 degrees overnight. The dried neat PBAT was charged to a co-rotating DSM micro-compounder which was operated at 100 rpm at a temperature of 180 degrees Celsius for 6 min. The sample was extruded to form a monofilament. Force values displayed by the extruder were recorded during extrusion. The extruded monofilaments were hand stretched to a final length of approximately 1 m from an initial unstretched length of 10 cm.

For Polymers 2 to 32, 34 and 35 in Table 1: Neat polymers (Polybutylene adipate terephthalate (PBAT), Xinjiang Blue Ridge Tunhe Polyester Co, Ltd.; Polybutylene succinate (PBS), Huaian Ruanke, China; Polypropylene (PP), Nexeo Plastics; Polylactic acid (PLA), NatureWorks LLC; approximately 20 g for each polymer in Table 1) were dried in a vacuum oven at 60 degrees C. overnight. Neat polymers or mixtures of neat polymers were combined with dicumyl peroxide (DCP) (Sigma-Aldrich) and various pH responsive moieties (2-dimethylaminoethyl methacrylate (2-DMAEMA), Sigma-Aldrich; 2-(Diisopropylamino)ethyl methacrylate (2-DIPAEMA), Sigma-Aldrich; Ethyl 3-(N,N-dimethylamino)acrylate (EDMAA), Sigma Aldrich; 2-(diethylamino)ethyl methacrylate (2-DEAEMA), Sigma-Aldrich, Canada; Methacrylic acid (MA), Sigma-Aldrich). The mixtures were prepared by coating the neat polymer(s) with an acetone solution containing the pH responsive moiety and peroxide and allowing the solvent to evaporate. Evaporation and drying was carried out for 8 hrs in a vacuum oven stabilized at 60 degrees Celsius. The coated neat polymer(s) was/were charged to a co-rotating DSM micro-compounder which was operated at 100 rpm at a temperature of 180 degrees Celsius. The reaction was carried out for 6 min. The samples were extruded to form monofilaments. Force values were recorded during extrusion. The extruded monofilaments were hand stretched to a final length of approximately 1 m from an initial unstretched length of 10 cm.

For Polymer 33 in Table 1: Monofilaments of Polymer 20 (20 g) were charged back into the DSM micro-compounder, together with polylactic acid (PLA) (20 g, NatureWorks LLC). The DSM micro-compounder was operated at 100 rpm at a temperature of 180 degrees Celsius for 6 min. The sample was extruded to form monofilaments.

TABLE 1

| Nomenclature | Composition |
|---|---|
| Polymer 1 | Neat PBAT |
| Polymer 2 | PBS (82 wt %) + PBAT (18 wt %) |
| Polymer 3 | PBS (18 wt %) + PBAT (82 wt %) |
| Polymer 4 | PBS (50 wt %) + PBAT (50 wt %) |
| Polymer 5 | Polymer 2 + 0.3 wt % DCP + 2.5 wt % 2-DMAEMA |
| Polymer 6 | Polymer 4 + 0.3 wt % DCP + 2.5 wt % 2- DMAEMA |
| Polymer 7 | Polymer 4 + 0.3 wt % DCP + 5.0 wt % 2- DMAEMA |
| Polymer 8 | Polymer 4 + 0.6 wt % DCP + 5.0 wt % 2- DMAEMA |
| Polymer 9 | Polymer 3 + 0.3 wt % DCP + 5.0 wt % 2- DMAEMA |
| Polymer 10 | Polymer 3 + 0.6 wt % DCP + 5.0 wt % 2- DMAEMA |
| Polymer 11 | PBS + 0.3 wt % DCP + 1.0 wt % 2- DMAEMA |
| Polymer 12 | PBS + 0.05 wt % DCP + 0.5 wt % 2- DMAEMA |
| Polymer 13 | PBS + 0.05 wt % DCP |
| Polymer 14 | PBAT + 0.05 wt % DCP |
| Polymer 15 | PBAT + 0.05 wt % DCP + 0.5 wt % 2-DMAEMA |
| Polymer 16 | PBAT + 0.1 wt % DCP |
| Polymer 17 | PBAT + 0.1 wt % DCP + 0.5 wt % 2-DMAEMA |
| Polymer 18 | PBAT + 0.2 wt % DCP + 0.5 wt % 2-DMAEMA |
| Polymer 19 | PBAT + 0.3 wt % DCP + 0.5 wt % 2-DMAEMA |
| Polymer 20 | PBAT + 0.2 wt % DCP + 1 wt % 2-DMAEMA |
| Polymer 21 | PBAT + 0.2 wt % DCP+ 1.5 wt % 2-DMAEMA |
| Polymer 22 | PBAT + 0.2 wt % DCP + 5 wt % 2-DMAEMA |
| Polymer 23 | PBS + 0.2 wt % DCP + 2.5 wt % 2-DMAEMA |
| Polymer 24 | PBAT + 0.8 wt % DCP + 5 wt % 2-DMAEMA |
| Polymer 25 | PBAT + 0.2 wt % DCP + 0.5 wt % 2-DIPAEMA |
| Polymer 26 | PBAT + 0.3 wt % DCP + 2.5 wt % 2- DIPAEMA |
| Polymer 27 | PBAT + 0.6 wt % DCP + 2.5 wt % 2- DIPAEMA |
| Polymer 28 | PBAT + 0.2 wt % DCP + 0.5 wt % EDMAA |
| Polymer 29 | PBAT + 0.3 wt % DCP+ 2.5 wt % EDMAA |
| Polymer 30 | PBAT + 0.6 wt % DCP + 2.5 wt % EDMAA |
| Polymer 31 | PBAT + 0.3 wt % DCP + 2.5 wt % 2-DEAEMA |
| Polymer 32 | PBAT + 0.6 wt % DCP + 2.5 wt % 2-DEAEMA |
| Polymer 33 | Polymer 20 (50 wt %) + PLA (50 wt %) |
| Polymer 34 | PP + 0.3 wt % DCP + 5 wt % 2-DEAEMA |
| Polymer 35 | PLA + 0.3 wt % DCP + 5 wt % MA |

(weight percentages are expressed as a percentage of the weight of the final product)

Contact Angle Analysis: Contact angle measurements were made for the polymers in Table 1; however, it is noted that in general, contact angle analysis is considered subject to human error. While contact angle analysis can be a preliminary indicator of hydrophilicity/hydrophobicity, degradation testing is considered a more reliable indicator of the pH responsiveness of the polymers.

For each measurement except for polymer 34, 500 mg of polymer was mixed with 10 mL of chloroform (Sigma-Aldrich). The solution was drop casted on a glass slide (Thermo-Fischer) and was spin coated at 6000 rpm. The resultant polymer film was air dried for 30 minutes, then subjected to contact angle analysis. For polymer 34, as polypropylene is not soluble in chloroform, samples were melted and shaped into a 1×3 inch sheet having a 1 mm thickness. Shaping was achieved via compression molding for 5 minutes using a Carver Hydraulic Press at 180 degrees Celsius, followed by cooling between two metal plates at 25 degrees Celsius for 5 minutes. Contact angles were calculated using a sessile drop method where a small volume of a liquid (0.1 M tris (hydroxymethyl) aminomethane buffer, with a pH of 7, 7.5, 8 or 8.5) was placed on the surface of the polymer film and an optical image was taken, using a USB camera mounted with a macrolens in combination with an XY stage. This optical image was analyzed (ImageJ) to trace the contact line, which was used to calculate the contact angle for the drop.

Subject to the caveat above regarding the unreliability of contact angle analysis, a liquid with a contact angle <90° indicates that the liquid prefers to wet the surface (hydrophilic); while a liquid with a contact angle >90° indicates that the liquid will minimize contact with the surface to form a more rounded droplet (hydrophobic). Within the hydrophilic limit, contact angles can be compared to assess relative hydrophilicity. For example, a first surface having a higher contact angle than a second surface can be considered to be relatively hydrophobic, even if both the contact angles lie in the hydrophilic range (a surface having a contact angle of 60 degrees is more hydrophobic than a surface having a contact angle of 30 degrees).

X-Ray Photoelectron Spectroscopy (XPS) Measurement: XPS measurements were made for the polymers in Table 1 to confirm the functionalization of the neat polymers with the pH responsive moiety. For each measurement, 500 mg of each polymer was dissolved in 10 mL of chloroform (Sigma-Aldrich). Each polymer solution was drop-casted on a 1 cm×1 cm piece of copper tape and air-dried overnight before analysis. The samples were analyzed for % C, O and N ratios on the surface of the polymer.

Gel Content Analysis: Gel content analysis of the polymers in Table 1 was conducted by extraction within boiling chloroform from a 120 mesh stainless steel sieve for 6 h, according to ASTM D 2765. The samples were dried overnight in a vacuum oven at 60° C. to remove the residual solvent. The residual polymer was dried to constant weight, with gel contents reported as a weight percentage of unextracted material.

Tensile Strength Testing: Tensile tests of monofilaments of the polymers in Table 1 were performed in an Instron® 3369 universal testing machine equipped with a 50 N load cell and fiber fixture. For comparison, two commercial fishing lines (Stren Original Monofilament, Monofilament line of 6 lbs (Mono 6 lbs) and Monofilament line of 10 lbs (Mono 10 lbs), purchased from Canadian Tire) were also tested. Cross head speed of 200 mm/min, 200 mm gap distance was used in tensile strength testing. Monofilaments tested had diameter between about 0.20 and 0.35 mm.

Degradation Testing: Approximately 100 mg of polymer was placed in a separate vial containing a buffer (0.1 M tris (hydroxymethyl) aminomethane buffer) of pH 7, pH 8 or pH 8.5, prepared in saltwater. Saltwater buffers were prepared by adding 3.5 mg of NaCl salt in the 100 mL of buffer. Each of these vials were simultaneously incubated at 75° C. for 1 week, to accelerate the degradation test.

Results & Discussion

Due to the large number of polymer samples, not all tests were done for each sample. In some instances, only polymer formulations that showed promising initial results were subjected to further tests. Where tests were not performed, results are marked with "n/a".

Reactive Extrusion: Force value results recorded during reactive extrusion are shown in Table 2.

TABLE 2

| Sample | Force Value (N) |
|---|---|
| Polymer 1 | 800 |
| Polymer 2 | 763 |
| Polymer 3 | 870 |
| Polymer 4 | 850 |
| Polymer 5 | 610 |
| Polymer 6 | 650 |
| Polymer 7 | 400 (it was observed that this fiber breaks easily) |
| Polymer 8 | 450 (it was observed that this fiber breaks easily) |
| Polymer 9 | 870 |
| Polymer 10 | 870 |
| Polymer 11 | >2000 (reached limit of extruder) |
| Polymer 12 | >2000 (reached limit of extruder) |
| Polymer 13 | 1450 |
| Polymer 14 | 1500 |
| Polymer 15 | 1400 |
| Polymer 16 | 1500 |
| Polymer 17 | 1400 |
| Polymer 18 | 1300 |
| Polymer 19 | 1600 |
| Polymer 20 | n/a |
| Polymer 21 | 1200 |
| Polymer 22 | 922 |
| Polymer 23 | 500 |
| Polymer 24 | 810 |
| Polymer 25 | 1200 |
| Polymer 26 | n/a |
| Polymer 27 | 850 |
| Polymer 28 | 1300 |
| Polymer 29 | n/a |
| Polymer 30 | n/a |
| Polymer 31 | n/a |
| Polymer 32 | n/a |
| Polymer 33 | n/a |
| Polymer 34 | 658 |
| Polymer 35 | 530 |

Force value is an indicator of viscosity, which in turn is an indicator of a successful graft reaction. Table 2 shows in an increase in force values for modified polymers, which shows that grafting was successful.

It was observed that a high ratio of PBS (>30 wt. %) with PBAT resulted in breakage during hand stretching.

Figure 3:
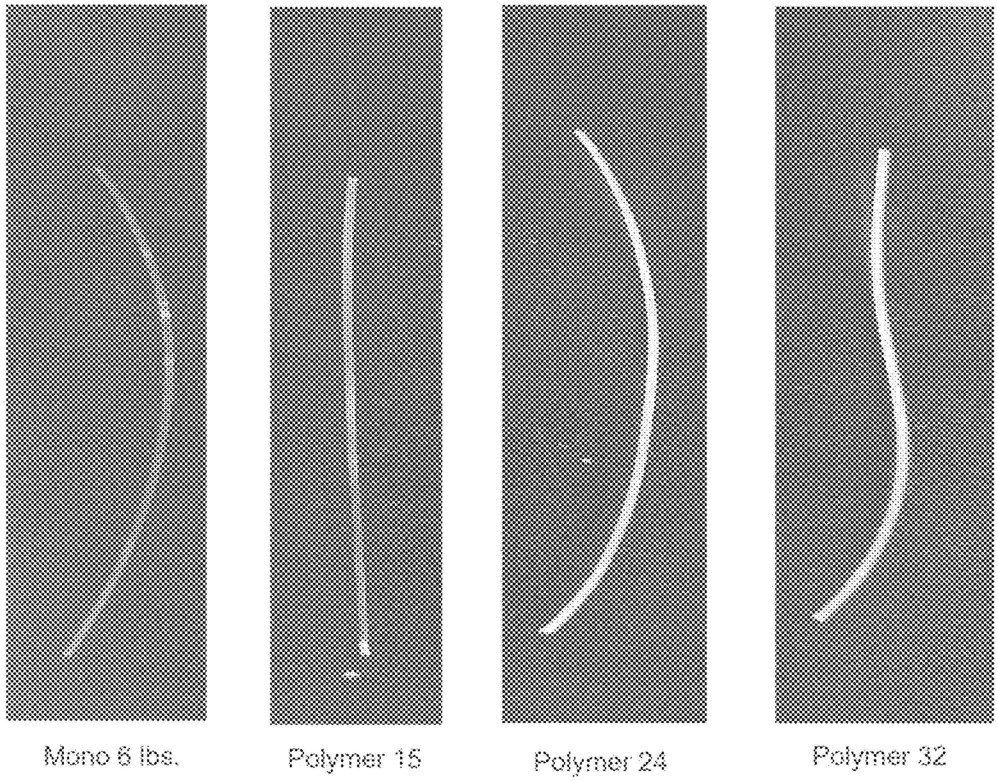
FIG. 3 includes photographs of certain polymer lines as disclosed herein.

Images of Monofilaments: Images of some of the monofilaments are shown in FIG. 3.

Contact Angle Analysis: Contact angle results are shown in Table 3. Some of the polymers (e.g. Polymer 6) showed an increase in contact angle values as the pH was increased from 7 to 8; however, at a pH of 8, the contact angle either decreased or did not increase. This indicates that such polymers will be protonated at or below around pH 8 (deep sea and lakes) and deprotonated above that pH (ocean and lake surfaces). Other polymers (e.g. Polymer 35) showed an increase in contact angle values as the pH decreased. This indicates that such polymers will be protonated under basic conditions and deprotonated under acidic conditions.

TABLE 3

| Sample | pH | Contact Angle | Standard Deviation |
|---|---|---|---|
| Polymer 1 | 7 | 75 | 0.7 |
| | 7.5 | 74.2 | 1 |
| | 8 | 75.7 | 0.5 |
| | 8.5 | 75.4 | 0.9 |

TABLE 3-continued

| Sample | pH | Contact Angle | Standard Deviation |
|---|---|---|---|
| Polymer 2 | 7 | 62.6 | 2.5 |
| | 7.5 | 76.1 | 0.55 |
| | 8 | 71.6 | 2.23 |
| | 8.5 | 73.11 | 0.75 |
| Polymer 3 | 7 | 61.0 | 0.7 |
| | 7.5 | 62.3 | 0.8 |
| | 8 | 61.5 | 0.4 |
| | 8.5 | 61.7 | 1.1 |
| Polymer 4 | 7 | 63.9 | 0.2 |
| | 7.5 | 61.0 | 1.1 |
| | 8 | 61.1 | 1.9 |
| | 8.5 | 61.5 | 1.4 |
| Polymer 5 | 7 | 63.5 | 0.9 |
| | 7.5 | 66.0 | 2.2 |
| | 8 | 66.4 | 0.3 |
| | 8.5 | 66.1 | 1.0 |
| Polymer 6 | 7 | 56.6 | 1.6 |
| | 7.5 | 58.6 | 1.0 |
| | 8 | 58.9 | 0.3 |
| | 8.5 | 61.6 | 0.2 |
| Polymer 7 | n/a | n/a | n/a |
| to | n/a | n/a | n/a |
| Polymer 17 | n/a | n/a | n/a |
| | n/a | n/a | n/a |
| Polymer 18 | 7 | 69.9 | 1.1 |
| | 7.5 | 70.1 | 1 |
| | 8 | 66.2 | 0.3 |
| | 8.5 | 65.3 | 0.7 |
| Polymer 19 | n/a | n/a | n/a |
| | n/a | n/a | n/a |
| | n/a | n/a | n/a |
| | n/a | n/a | n/a |
| Polymer 20 | 7 | 65.3 | 0.8 |
| | 7.5 | 64.5 | 0.7 |
| | 8 | 62.7 | 0.2 |
| | 8.5 | 57.6 | 0.4 |
| Polymer 21 | 7 | 58.6 | 0.5 |
| | 7.5 | 65.0 | 0.3 |
| | 8 | 63.8 | 0.7 |
| | 8.5 | 57.9 | 0.5 |
| Polymer 22 | 7 | 59.0 | 0.1 |
| | 7.5 | 61.4 | 0.5 |
| | 8 | 54.5 | 0.6 |
| | 8.5 | 48.1 | 0.7 |
| Polymer 23 | 7 | 72.9 | 0.8 |
| | 7.5 | 72.6 | 0.5 |
| | 8 | 66.4 | 0.2 |
| | 8.5 | 65.0 | 0.6 |
| Polymer 24 | 7 | 52.7 | 0.3 |
| | 7.5 | 53.4 | 1.8 |
| | 8 | 47.2 | 0.8 |
| | 8.5 | 44.4 | 0.3 |
| Polymer 25 | 7 | 65.7 | 0.3 |
| | 7.5 | 66.0 | 0.2 |
| | 8 | 62.1 | 0.8 |
| | 8.5 | 70.8 | 0.6 |
| Polymer 26 | 7 | 60.6 | 0.1 |
| | 7.5 | 60.6 | 1.1 |
| | 8 | 55.5 | 0.5 |
| | 8.5 | 55.9 | 0.7 |
| Polymer 27 | 7 | 55.6 | 0.9 |
| | 7.5 | 57.5 | 0.3 |
| | 8 | 59 | 0.7 |
| | 8.5 | 49.3 | 0.6 |
| Polymer 28 | 7 | 66 | 0.5 |
| | 7.5 | 69.5 | 1.1 |
| | 8 | 67.5 | 0.5 |
| | 8.5 | 68.7 | 1 |
| Polymer 29 | 7 | 62.7 | 0.4 |
| | 7.5 | 65.4 | 0.2 |
| | 8 | 62.7 | 0.8 |
| | 8.5 | 64 | 0.4 |
| Polymer 30 | 7 | 64 | 0.9 |
| | 7.5 | 70 | 1.8 |
| | 8 | 68.8 | 0.4 |
| | 8.5 | 68.6 | 0.8 |

TABLE 3-continued

| Sample | pH | Contact Angle | Standard Deviation |
|---|---|---|---|
| Polymer 31 | 7 | 53.9 | 0.2 |
| | 7.5 | 50.4 | 0.5 |
| | 8 | 48.7 | 0.6 |
| | 8.5 | 48.1 | 0.4 |
| Polymer 32 | 7 | 53.9 | 0.4 |
| | 7.5 | 47.1 | 0.9 |
| | 8 | 50 | 0.2 |
| | 8.5 | 45.9 | 0.2 |
| Polymer 33 | n/a | n/a | n/a |
| | n/a | n/a | n/a |
| | n/a | n/a | n/a |
| | n/a | n/a | n/a |
| Polymer 34 | 6.5 | 83.0 | 1.0 |
| | 7.0 | 88.7 | 0.9 |
| | 7.5 | 92.3 | 0.5 |
| | 8.0 | 97.0 | 2.0 |
| | 8.5 | 100.3 | 0.5 |
| Polymer 35 | 6.5 | 60.0 | 1.6 |
| | 7.0 | 57.7 | 0.5 |
| | 7.5 | 52.8 | 0.2 |
| | 8.5 | 48.7 | 0.9 |

XPS Measurement: XPS results showed that neat PBAT (0% Nitrogen) was successfully functionalized with the pH responsive moieties (amines). The % nitrogen in the polymers ranged from 1.4 to 5, based on the amount added into the reaction mixture and assuming complete grafting. Results are shown in Table 4.

TABLE 4

| Polymer | Name | % Atomic Concentration |
|---|---|---|
| Control | O 1s | 30.15 |
| | C 1s | 69.85 |
| Polymer 1 | O 1s | n/a |
| to | N 1s | n/a |
| Polymer 20 | C 1s | n/a |
| Polymer 21 | O 1s | 30.46 |
| | N 1s | 3.14 |
| | C 1s | 66.4 |
| Polymer 22 | O 1s | 29.72 |
| | N 1s | 2.86 |
| | C 1s | 67.42 |
| Polymer 23 | O 1s | 30.15 |
| | N 1s | n/a |
| | C 1s | 70.91 |
| Polymer 24 | O 1s | 23.29 |
| | N 1s | 5.79 |
| | C 1s | 70.91 |
| Polymer 25 | O 1s | n/a |
| | N 1s | n/a |
| | C 1s | n/a |
| Polymer 26 | O 1s | n/a |
| | N 1s | n/a |
| | C 1s | n/a |
| Polymer 27 | O 1s | 32.86 |
| | N 1s | 1.46 |
| | C 1s | 65.68 |
| Polymer 28 | O 1s | 31.93 |
| | N 1s | 1.62 |
| | C 1s | 66.45 |
| Polymer 29 | O 1s | n/a |
| to | N 1s | n/a |
| Polymer 33 | C 1s | n/a |
| Polymer 34 | O 1s | n/a |
| & | N 1s | n/a |
| Polymer 35 | C 1s | n/a |

Gel Content Analysis: Gel content analysis is available for only Polymer 11. Gel content for Polymer 11 was 56.3%.

Tensile Strength Testing: Tensile test results are shown in Table 5.

TABLE 5

| Polymer | Tensile strength at break (MPa) | Elongation at break (%) |
|---|---|---|
| Mono 6 lbs | 40 | 90 |
| Mono 10 lbs | 100 | 60 |
| Polymer 1 | 50 | 160 |
| Polymers 2 to 23 and 25 to 32 | n/a | n/a |
| Polymer 24 | 40 | 500 |
| Polymer 33 | 44 | 15 |
| Polymers 34 & 35 | n/a | n/a |

Polymers 24 and 33 were flexible enough to be wound on a reel. Table 5 shows that Polymer 24 has a similar tensile strength to the monofilament line of 6 lbs. The high elongation of 500% for Polymer 24 was reduced by blending Polymer 24 with PLA, to form Polymer 33. Polymer 33 showed a lower elongation (of 15%), with a similar tensile strength to that of Mono 6 lbs.

Figure 4:
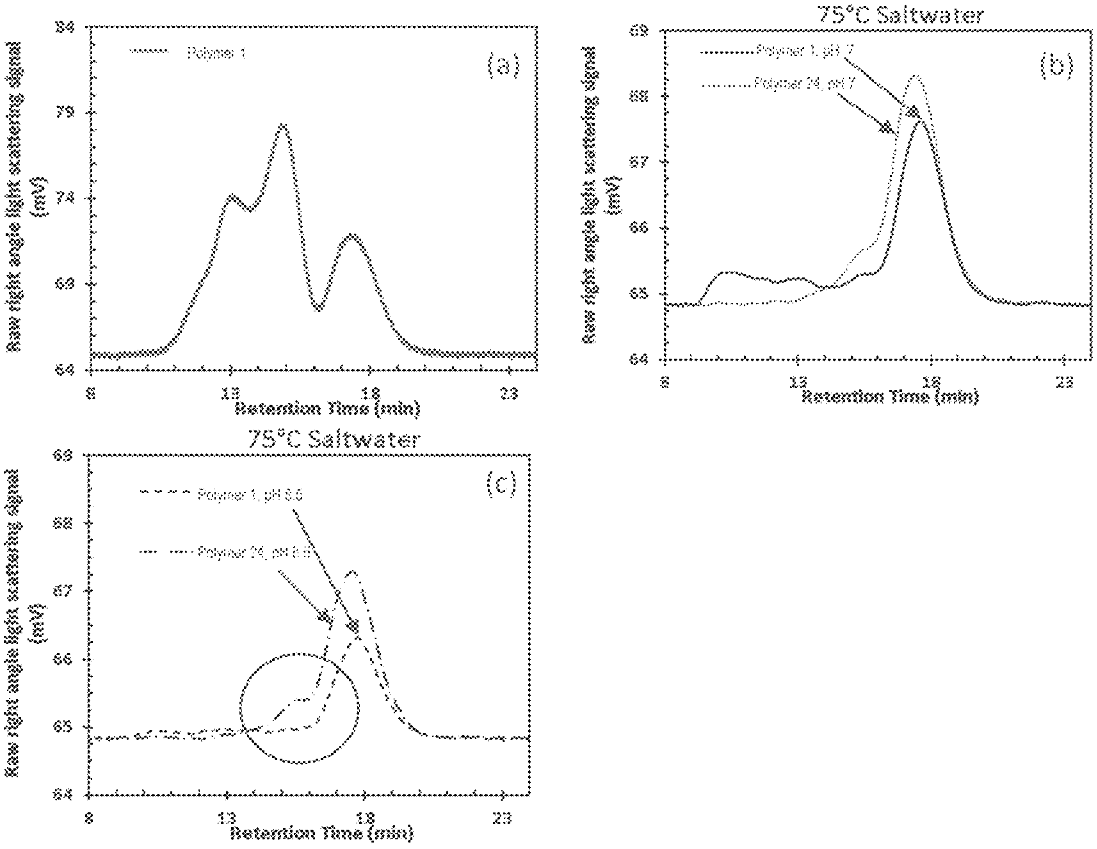
FIG. 4 shows the results of degradation testing of certain polymers disclosed herein.

Degradation Testing: FIG. 4 shows results of degradation testing. Right angle light scattering signal (RALS) vs retention time is shown for various formulations. Signals at low retention times correspond to high molecular weight fractions. High molecular weight fractions are known to provide mechanical strength to samples. Panel (a) Shows RALS signal of neat PBAT (Polymer 1) before the start of degradation. Panel (b) Shows RALS signal for samples degraded at pH of 7. There is a presence of high molecular components in between 9 and 14 mins elution time for PBAT. This is absent for Polymer 24, which is indicative of better degradation of Polymer 24 at pH 7 than Polymer 1. Panel (c) Represents RALS signal for degradation at a pH of 8.5. The circled region shows the presence of high molecular weight components at retention time of about 16 min for Polymer 24, which is absent for Polymer 1.

We claim:

1. A biodegradable polymer comprising:

a polymer backbone comprising monomeric units that are susceptible to hydrolytic degradation; and a plurality of pH responsive moieties, each pH responsive moiety grafted to a respective one of the monomeric units, wherein the pH responsive moieties are relatively hydrophilic when exposed to an aqueous solution of a pro-biodegradation pH range to facilitate hydrolytic degradation of the monomeric units, and are relatively hydrophobic when removed from the aqueous solution of the pro-biodegradation pH range, to protect the monomeric units from hydrolytic degradation;

wherein the polymer backbone comprises polybutylene adipate-co-terephthalate and the pH responsive moieties comprise 2-dimethylaminoethyl methacrylate.

2. The biodegradable polymer of claim 1, wherein the pH responsive moieties have a pKa, and the pro-biodegradation pH range is below the pKa.

3. The biodegradable polymer of claim 1, wherein the pro-biodegradation pH range is at or below about 7.5.

4. The biodegradable polymer of claim 1, wherein the pro-biodegradation pH range is between about 6.5 and about 7.5, inclusive.

5. The polymer of claim 1, wherein the pH responsive moieties have a pKa, and the pro-biodegradation pH range is above the pKa.

6. The polymer of claim 5, wherein the pro-biodegradation pH range is at or above about 7.5.

7. The biodegradable polymer of claim 1, wherein the polymer backbone further comprises polybutylene succinate (PBS), and/or polylactic acid (PLA).

8. A polymer comprising:

a polymer backbone comprising monomeric units; and a plurality of pH responsive moieties, each pH responsive moiety grafted to a respective one of the monomeric units, wherein the pH responsive moieties are relatively hydrophilic when exposed to an aqueous solution of a first pH range, and are relatively hydrophobic when removed from the aqueous solution of the first pH range;

wherein the polymer backbone comprises polybutylene adipate-co-terephthalate and the pH responsive moieties comprise 2-dimethylaminoethyl methacrylate.

* * * * *